(12) United States Patent
Mc Kee et al.

(10) Patent No.: US 6,420,483 B1
(45) Date of Patent: Jul. 16, 2002

(54) PREPARATION OF IMPACT-MODIFIED PLASTICS

(75) Inventors: Graham Edmund Mc Kee, Neustadt; Hermann Gausepohl, Mutterstadt; Norbert Niessner, Friedelsheim; Norbert Güntherberg, Speyer, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/685,742

(22) Filed: Oct. 11, 2000

(30) Foreign Application Priority Data

Oct. 27, 1999 (DE) .......................................... 199 51 679

(51) Int. Cl.[7] .............................. C08F 8/100; C08L 9/00; C08L 23/00; C08L 25/02; C08L 33/18
(52) U.S. Cl. ...................... 525/191; 525/193; 525/232; 525/238; 525/240; 525/241
(58) Field of Search ................................ 525/191, 193, 525/232, 238, 240, 241

(56) References Cited

U.S. PATENT DOCUMENTS

| 3,851,014 A | 11/1974 | Dalton |
| 3,903,199 A | 9/1975 | Dalton |
| 3,903,200 A | 9/1975 | Cincera |
| 3,957,912 A | 5/1976 | Cincera |
| 4,454,305 A | 6/1984 | Lindner et al. ............. 525/310 |
| 5,186,993 A | * 2/1993 | Haliden-Abberton et al. ..... 428/36.92 |

FOREIGN PATENT DOCUMENTS

| DE | 2 400 659 | 7/1974 |
| DE | 29 10 168 | 9/1980 |
| DE | 44 40 676 | 5/1996 |

* cited by examiner

Primary Examiner—Nathan M. Nutter
(74) Attorney, Agent, or Firm—Keil & Weinkauf

(57) ABSTRACT

The invention relates to a process for preparing an impact-modified plastic, where
  particles of a crosslinked rubber are produced from a first monomer mixture which has at least 50% by weight of conjugated diene compounds,
  the rubber particles are added to a second monomer mixture which has at least 85% by weight, preferably at least 90% by weight, in particular at least 98% by weight, of styrene, and
  the monomers of the second monomer mixture are polymerized.

This process can prepare novel and improved impact-modified plastics. Novel impact-modified plastics are also described.

13 Claims, No Drawings

PREPARATION OF IMPACT-MODIFIED PLASTICS

BACKGROUND OF THE INVENTION

The invention relates to a process for preparing impact-modified plastics, and also to an impact-modified plastic obtainable using the process.

Impact-modified plastics have improved mechanical properties, making them particularly suitable for many applications, for example consumer articles. These particular properties are achieved through the structure of these plastics, in which elastomer domains, for example rubber domains, have been embedded in a matrix made from the thermoplastic. The presence of more than one phase in these impact-modified plastics, and therefore also their domain structure, arises due to their build-up from different polymeric components which are immiscible, or only partially miscible, with one another. Their impact-strength is a result of absorbing more energy during deformation before fracture occurs. This energy is used in forming microcavities or for inducing sliding effects within the matrix polymer chains. The presence of more than one phase is therefore a necessary precondition for achieving high impact strengths.

Other factors which apply are as follows:
1. The two chemically different polymeric components generally form a stable dispersion with a defined particle size, showing only little phase separation during processing and without any tendency to homogenize with formation of a macromolecular solution on exposure to relatively intense heat.
2. There must be some coupling present between the elastomer particles and the matrix, that is to say the phase boundaries must be capable of transferring forces.

The most effective coupling at the elastomer particle interfaces is achieved by graft copolymerization. The process here is generally to take a rubber and then to graft a copolymer onto this by polymerizing with a monomer mixture.

DESCRIPTION OF THE RELATED ART INCLUDING INFORMATION DISCLOSURE UNDER 37 CFR 1.97 and 198.

DE-A-2 910 168 discloses stable, flowable dispersions of rubbers in the form of discrete particles of average diameter from 100 to 3000 nm in organic liquids in which the rubber present is from 1 to 20% by weight (based on the entire dispersion) of a crosslinked diene rubber, and from 0 to 20% by weight of water in the form of a water-in-oil emulsion is present. As continuous organic phase they comprise from 99 to 66% by weight of $C_1$–$C_{10}$-alkyl acrylates or alkyl methacrylates, methyl methacrylate, ethyl acrylate or n-hexylacrylate. As an alternative, they may also comprise, as liquid phase, a mixture of from 85 to 50% by weight of styrene or x-methylstyrene and from 15 to 50% by weight of acrylonitrile, methacrylonitrile or $C_1$–$C_6$-alkyl acrylates or, respectively, alkyl methacrylates, such as methyl methacrylate, ethyl acrylate or n-hexyl acrylate. A further alternative proposed for the continuous organic phase is a mixture of from 85 to 50% by weight of $C_1$–$C_{10}$-alkyl acrylate or, respectively, alkyl methacrylate and from 15 to 50% by weight of acrylontrile, methacrylonitrile or styrene. The continuous organic phase may in each case comprise up to 60% by weight of an admixed liquid hydrocarbon. Aqueous emulsions of crosslinked, rubbery diene polymers are dispersed in certain organic liquids, and the result is dispersion of the diene polymers in the form of swollen particles. The water of the initial emulsion is likewise present in dispersed form in the organic liquid, as a water-in-oil emulsion. If required, the water may be removed by selectively breaking the water-in-oil emulsion and separating off the water. However, for most applications of the organic rubber dispersions there is no requirement to separate off the water, but it must be in stable dispersed form and not separate out as a distinct phase.

DE-A-4 440 676 describes a process for preparing rubber molding compositions, and also rubber-modified molding compositions prepared by the process. Here, a first stage polymerizes a mixture which comprises at least one alkyl acrylate or alkyl methacrylate, a first monomer having two or more double bonds and, if desired, one or more second monomers, to give a rubber, preferably using free radicals. A second stage dissolves, or swells, the resultant rubber in one or more third monomers to give a second mixture, if desired with addition of a solvent, and a third stage polymerizes the second mixture formed by the dissolution or swelling, to give the rubber-modified molding composition. Examples of first monomers are allyl methacrylate, butanediol diacrylate, divinylbenzene, triallyl cyanurate and dihydrodicyclopentadienyl acrylate, and the latter is preferred. The dienes used therefore comprise compounds with isolated double bond. Examples given for the second monomers are styrene, acrylonitrile, acrylic acid, methacrylic acid, and also derivatives of the two latter monomers.

DE-A-2 400 659 describes a process for preparing rubber-modified resins. Here, an alkadiene rubber, which has been grafted with monovinylidene-aromatic monomers and with alkene nitrile monomers, is dispersed into a hot melt of a base copolymer composition of monovinylidene-aromatic monomers and alkene nitrile monomers. The impact-modified plastic is therefore prepared through a physical mixing procedure. The grafting required for adequate force-transfer between polymer matrix and rubber has to be carried out in a separate step.

U.S. Pat. No. 3,957,912 describes a process for preparing an acrylonitrile-butadiene-styrene plastic. Here, an alkyldiene rubber is first polymerized with styrene and/or acrylonitrile monomers by emulsion polymerization, to give a grafted rubber. Styrene and/or acrylonitrile are then added to this rubber, as is at least one solvent for the styrene-acrylonitrile copolymers. The rubber is taken up in the solvent, the water is separated off, and the mixture of rubber, solvent and monomer is polymerized. The transfer of the rubber into the solvent makes this process complicated to carry out.

U.S. Pat. No. 3,903,199 and U.S. Pat. No. 3,903,200 describe processes for preparing acrylonitrile-butadiene-styrene polymers. Here, particles of a first grafted rubber are dispersed in a mixture of a monovinylidene-aromatic monomer and an alkene nitrile monomer. The process consists in either first partially polymerizing the mixture and then adding particles of a second grafted rubber and polymerizing the matrix to completion or in adding the particles of the second grafted rubber directly to the mixture of the monomers and polymerizing the matrix to completion. In both cases the plastic obtained has bimodal size distribution of the rubber particles.

Due to the particular properties of impact-modified plastics, their wide application and their resultant economic importance, there is a constant requirement for new and improved plastics of this type.

It is an object of the present invention, therefore, to provide a process for preparing impact-modified plastics, and also an impact-modified plastic obtainable by this process.

BRIEF SUMMARY OF THE INVENTION

We have found that this object is achieved by means of a process for preparing an impact-modified plastic, where in a first step, particles of a crosslinked rubber are produced from a first monomer mixture which has at least 50% by weight of conjugated diene compounds, the rubber particles are added to a second monomer mixture which has at least 85% by weight, preferably at least 90% by weight, in particular at least 98% by weight, of styrene, and the monomers of the second monomer mixture are polymerized.

DETAILED DESCRIPTION OF THE INVENTION

The first step of the process produces a rubber in particle form, onto which the monomers of the second monomer mixture are then grafted. This gives effective phase coupling at the interfaces between the elastomer particles and the surrounding polymer matrix. No separate step is required to polymerize-on the graft shell. The high proportion of conjugated diene compounds in the rubber gives better resistance to mechanical effects, and this is also true at relatively low temperatures. There is no requirement for the dispersion of the rubber to be stable. In many cases the swelling of the rubber particles in the second monomer mixture causes gel formation. During polymerization of the second monomer mixture phase separation occurs, making the product flowable. There is no requirement for grafting of the rubber prior to the polymerization of the second monomer mixture in order to obtain the desired mechanical properties.

Examples of conjugated diene compounds suitable for preparing the rubber are butadiene, isoprene, 2-chloro-1,3-butadiene, 1-chloro-1,3-butadiene, and also other substituted butadienes and isoprenes. The rubber dispersion may be prepared by emulsion, miniemulsion or microsuspension methods, for example. The rubber may be added as an aqueous dispersion, but it is also possible for the water to be removed and the rubber particles to have a water content below 5% by weight when added to the second monomer mixture. The rubber particles may also first be coagulated and, after separating off some of the water, have a water content of from 5 to 60% by weight when added to the second monomer mixture. The separation of the water from the rubber particles may take place by pressure filtration, centrifuging or drawing off the water at reduced pressure, for example.

There are various ways of adding the rubber dispersion to the second monomer mixture. The dispersion may be directly added to the monomer mixture, but it is also possible for one of the monomers to form an initial charge and then for the rubber dispersion to be added, followed by the other monomers of the monomer mixture. The latter method is useful when, for example, the further monomer of the second monomer mixture is more volatile than water and the water is to be separated off prior to starting polymerization of the second monomer mixture. In this case, a less volatile monomer of the second monomer mixture, for example styrene, forms an initial charge. The aqueous rubber dispersion is then added and the water separated off, for example by distillation. The more volatile monomers, such as acrylonitrile, may then be added so that the second monomer mixture can then be polymerized in the third step.

The water deriving from the rubber dispersion may be removed from the reaction mixture in various ways. It may be distilled off, either prior to the polymerization or else during the polymerization of the second monomer mixture. In the latter case, the evaporating water can serve for evaporative cooling. It is also possible for the water to be removed by decanting after the rubber dispersion has been broken.

The second monomer mixture may also comprise only styrene, that is to say may also be free from admixtures. This improves the color of the product. The process is moreover simpler to carry out, since in comparison with acrylonitrile, styrene is considerably less water-soluble and volatile in water vapor. Smaller amounts of monomers are therefore lost during removal of the water.

In one particular embodiment of the process, the second monomer mixture may also comprise at least one further polymer which is preferably compatible or partially compatible with the polymer obtained from the second monomer mixture. For the purposes of the present invention, compatibility implies that no phase separation occurs between the at least one further polymer and the polymer obtained from the second monomer mixture. One way of preparing the further polymer is to polymerize the second monomer mixture to some extent and then add the rubber dispersion to the partially polymerized monomer mixture, and then to complete the polymerization of the second monomer mixture.

The further polymer preferably has a glass transition temperature $T_g$ of 0° C., preferably >20° C., in particular >50° C.

The rubber particles may have a hard core made from a copolymer which preferably has a glass transition temperature >0° C., particularly preferably >10° C., in particular >20° C. This hard core may be composed of polystyrene, for example.

The hard core preferably has a refractive index above 1.53, preferably above 1.56, in particular above 1.57. Impact-modified plastics which comprise small rubber particles are mostly opaque. They are therefore very difficult to color. The hard core enables the refractive index of the rubber particles to be brought close to that of the surrounding polymer matrix, reducing light scattering. This equalizing process is particularly effective with a hard core which comprises styrene or comprises a styrene derivative. These polymers have particularly high refractive index.

The size of the rubber particles in the polymer matrix is preferably below 10 μm, with preference below 5 μm, in particular below 4 μm.

The swelling index of the rubber particles is preferably from 2 to 200, with preference from 3 to 100, in particular from 5 to 90. The swelling index is determined as follows:

A film is cast using the dispersion of the grafted crosslinked rubber particles, and the water removed by evaporation at 23° C. The film is then dried at reduced pressure and 50° C. About 0.5 g of the film is swollen for 24 hours in a solvent, such as tetrahydrofuran or dimethylformamide. The polymer gel is then separated by centrifuging from the solvent not bound into the gel. The gel is weighed, then dried and weighed again. The swelling index (SI) is calculated from the following equation:

$$SI = \frac{\text{Weight of swollen polymer gel}}{\text{Weight of dried polymer gel}}$$

In one preferred embodiment, the rubber particles are in the form of a dispersion in water when added to the second monomer mixture, and, if desired, the mixture made from the rubber particles in water and from the second monomer mixture is homogenized, in particular by high-speed stirring.

After the rubber and the monomers have been mixed, the monomers may be polymerized immediately, or the rubber may first be swollen with the monomers and then the polymerization be carried out.

Up to 80% by weight, preferably up to 60% by weight, in particular up to 20% by weight, of a solvent may have been added to the second monomer mixture. Examples of suitable solvents are toluene, ethylbenzene, dimethylformamide, acetone, etc.

The polymerization may be carried out in bulk or in solution. The polymerization of the second monomer mixture may also advantageously be carried out in suspension. The resultant reaction mixture is flowable and easier to process. It is also possible for the reaction in solution or bulk to be converted to a reaction in suspension during the polymerization.

The impact-modified plastic obtained using the novel process has high mechanical strength. It may also be present in a mixture with at least one additional synthetic polymer. Suitable additional synthetic polymers are polycarbonates, polyesters, polyamides, polyalkyl methacrylates, where for the purposes of the present invention these are either homo- or else copolymers, and also high-temperature-resistant polysulfones and high-temperature-resistant poly(ether) sulfones. Other polymers are polypropylene, polyethylene, polytetrafluoroethylene (PTFE) and polystyrene-acrylonitrile. Preference is given to polyphenylene ether (PPE), syndiotactic polystyrene, styrene-diphenylethylene copolymers, and also copolymers having a styrene content above 85% by weight.

Besides the components described, the rubber-modified molding compositions may also comprise the usual amounts of additives, such as lubricants, mold-release agents, pigments, dyes, flame retardants, antioxidants, stabilizers to prevent damage by reaction of light, fibrous or pulverulent fillers, fibrous or pulverulent reinforcing materials, or antistats.

Examples are used to describe the invention in greater detail. The following compounds are used in the examples:

Styrene and acrylonitrile were obtained from BASF and used without further purification.

t-Dodecyl mercaptan was obtained from Bayer AG.

Benzoyl peroxide was obtained from Akzo Co.

Mowiol® 4–88 is a polyvinyl alcohol with a degree of hydrolysis of 88 mol % and viscosity, as a 4% strength solution in water at 20° C., of 8 mPa·sec., measured to DIN 53015, and is marketed by Hoechst AG.

Mowiol® 4–88 is similar to Mowiol® 8–88, but the viscosity of a 4% strength solution in water at 20° C. is 4 mpa·sec.

The emulsifier K 30 is the sodium salt of a $C_{12}$–$C_{16}$ paraffinsulfonic acid and is marketed by Bayer AG.

Luviskol® K 90 is a BASF AG product and is a polyvinylpyrrolidone with a K value of 90, measured from a 1% strength solution in water at 25° C. K value measurement is described in Cellulose Chemie, 13, 1932, pp. 358–364.

Ertivinol® 30/92 is a polyvinyl alcohol from Ercos.

Perkadox® 24 is a dicetyl peroxydicarbonate from Akzo Nobel Co.

EXAMPLE 1

Preparation of Impact-modified Polystyrene a) Preparation of the Polybutadiene Rubber A polybutadiene dispersion with a theoretical solids content of 44% by weight was prepared at 65° C. using potassium stearate as emulsifier and potassium persulfate as initiator.

The dispersion had the following properties:

| Particle size: | 85 nm (narrow distribution) |
| Solids content: | 41.7% by weight |
| Swelling index: | 32 |
| Gel content: | 97% | b) Preparation of the Final Product 920 g of styrene were added to 191.8 g of the polybutadiene dispersion obtained under a) and allowed to stand at room temperature for 22 hours to swell the rubber particles. The mixture was then vigorously dispersed, followed by addition of 1.0 g of tert-dodecyl mercaptan and 111.18 g of a 10% strength solution of Mowiol® 8–88 in water.

The mixture was transferred to 61 steel reactor equipped with a stirrer and with a thermometer which acted as a baffle. The mixture was heated to 123° C. under nitrogen and stirred at 150 rpm. After 30 minutes at 123° C. the conversion was 4.5%. The stirrer speed was increased to 150 rpm and 0.92 g of dicumyl peroxide was added, as were a solution of 10 g of Luviskol® K90, 3 g of Ertivinol® 30/93 and 0.1 g of $Na_4P_2O_7$ in 2030 g of water. The resultant suspension was held for a further 3 hours at 110° C., and for 3 hours at 130° C. and then for 6 hours at 140° C. The reaction mixture was cooled. The solids were separated off by filtration through Calico®, dried in vacuo at 80° C. and extruded through a Haaker extruder at 240° C. The properties of the material were tested using standard small injection-molded specimens.

EXAMPLE 2

The method for Example 2 is the same as for Example 1, except that after addition of the rubber dispersion to the styrene monomers the reaction mixture was immediately processed further. 1.33 g of tert-butyl peroxide were added to the styrene as initiator for the polymerization. The polymerization here took place initially at 86° C. to a conversion of 7.5%, which was achieved after 45 minutes of reaction time. The reaction mixture was then converted into a suspension, as in Example 1, and its polymerization completed.

EXAMPLE 3

Preparation of Impact-modified Polystyrene a) Preparation of the Polybutadiene Rubber A polybutadiene dispersion with the following properties was prepared:

| Particle size: | 100 nm (narrow distribution) |
| Solids content: | 41.3% by weight |
| Swelling index: | 63 |
| Gel content: | 66% | b) Preparation of the Final Product

As in Example 1, and in a steel reactor, 985 g of styrene were added to 36.3 g of the polybutadiene dispersion obtained under a), and the mixture was allowed to stand for 12 hours at room temperature to swell the rubber particles. The mixture was heated under nitrogen to 123° C. and stirred at 150 rpm.

After 45 minutes at 123° C., the stirrer speed was increased to 350 rpm, and 0.99 g of dicumyl peroxide was added, as were a solution of 20 g of Luviskol® K90, 6.1 g of Ertivinol® 30/93 and 2.0 g of $Na_4P_2O_7$ in 2030 g of water. The resultant suspension was held for a further 3 hours at 110° C., and for 3 hours at 130° C. and finally for 6 hours at 140° C. The reaction mixture was cooled. The solids were separated off by filtration through Calico®, dried in vacuo at 80° C. The properties of the material were tested using standard small injection-molded specimens.

EXAMPLE 4

Preparation of an impact-modified polystyrene
a) Rubber Preparation
Feed 1
4.0 kg of water
4.0 kg of butadiene
Feed 2
23.60 kg of water
4.17 kg of Mowiol® 4–88
0.41 kg of K 30 emulsifier
0.076 kg of sodium hydrogencarbonate
0.22 kg of t-dodecyl mercaptan
16.62 kg of butadiene
Feed 3
1.66 kg of water
0.0425 kg of sodium persulfate.

Feed 1 and Feed 2 were charged to a steel vessel via a dispersion device operated at 7000 rpm. Feed 1 here was charged first during a period of 10 minutes, and the reactor contents heated to 67° C. Feeds 2 and 3 were then added during a period of 2.5 hours, Feed 3 being added directly into the reactor.

After 12 hours, Feed 4 was added directly into the reactor.
Feed 4
2.0 kg of water
0.41 g of K 30 emulsifier The polymerization time was 13 hours. The reactor was then degassed and unreacted butadiene was separated off by applying subatmospheric pressure to the reactor and blowing nitrogen through the reaction mixture. After degassing, the solids content of the dispersion was 37.6% by weight. The average particle size, determined by Fraunhofer laser diffraction, was 3.6 $\mu$m.

b) Preparation of the Final Product 920 g of styrene were added to 209.4 g of the polybutadiene dispersion obtained under a), and the rubber particles swollen for 24 hours. 1.0 g of tert-dodecyl mercaptan, 0.46 g of Perkadox® 24, 0.46 g of tert-butyl perpivalate and 0.46 g of benzoyl peroxide were added, and the mixture transferred under nitrogen into a 61 steel reactor which had been equipped with a stirrer and with a thermometer which acted as a baffle. The mixture was heated to 150° C. over a period of 57 minutes, and converted into a suspension by increasing the stirrer speed to 350 rpm and adding a solution of 20 g of Luviskol® K 90, 6 g of Ertivinol® 30/93 and 2 g of $Na_4P_2O_7$ in 2030 g of water. The reaction mixture was polymerized for 12 hours at 150° C., and then cooled, and the solids content was then separated off by filtration through Calico®. The resultant polymer was dried at 80° C. in vacuo and injection molded to give standard small specimens.

EXAMPLE 5

Preparation of Impact-modified Polystyrene 9.8 g of the polybutadiene dispersion obtained under 4a) were added to 41.4 g of styrene and the water separated off by reduced-pressure distillation. The rubber particles were swollen for 12 hours. The mixture was then transferred into a glass ampoule sealed at one end. The mixture was frozen in liquid nitrogen and the ampoule sealed off by fusion. The sealed ampoule was placed in a metal tube held at 130° C. in an aluminum block. After 48 hours the glass ampoule was taken out and opened, and the polymer removed. The polymer was ground to give a powder and compression molded at 200° C. and 200 bar to give standard small specimens.

EXAMPLE 6

Preparation of Impact-modified Styrene

The method for Example 6 is similar to that for Example 5, but the rubber dispersion was coagulated using a magnesium sulphate solution, and the rubber was separated from the aqueous phase by filtration, and then dried. The dried rubber was added to the styrene, swollen for 12 hours and dispersed with the aid of an Ultra-Turrax® high-speed stirrer for 5 minutes at 800 rpm prior to polymerization of the styrene.

EXAMPLE 7

Comparison 46 g of styrene were placed in a glass ampoule, the ampoule sealed and the styrene polymerized at 130° C. for 48 hours. The polymer was ground and processed to give standard small specimens as described in Example 5.

Testing of the impact-modified polystyrenes.

On each of the standard small specimens produced in Examples 1 to 7, hole notched impact strength was measured to DIN 53753/ L-3.0, issue of April 1981, impact strength to DIN 53453-n, issue of May 1975, and notched impact strength to DIN 53453-k, issue of May 1975. The MVR was measured in ml/10 minutes at 200° C. and ssure of 21.6 kp, to DIN 53735. The results of the measurements are given in Table 1.

TABLE 1

| | Properties of polystyrene material | | | |
|---|---|---|---|---|
| Example | Impact strength kJ/m$^2$ at 23° C. | Notched impact strength kJ/m$^2$ at 23° C. | Hole notched impact strength kJ/m* at 23° C. | MRV, ml/ 10 min. 200° C./ 5 kp |
| 1 | 63 | 9 | 13 | — |
| 2 | 48 | 7 | 10 | 3 |
| 3 | 39 | 4.5 | 8.2 | — |
| 4 | 31 | 8 | 10 | 43 |
| 5 | — | 9 | 12 | — |
| 6 | — | 9 | — | — |
| 7 | — | 2.5 | 4 | — |

We claim:
1. A process for preparing an impact-modified plastic, where
  particles of a crosslinked rubber are produced from a first monomer mixture which has at least 50% by weight of conjugated diene compounds, the rubber particles are added to a second monomer mixture which has at least 85% by weight of styrene, and the monomers of the second monomer mixture are polymerized.

2. A process as claimed in claim 1, where the second monomer mixture comprises acrylonitrile as a further monomer.

3. A process as claimed in claim 1, where the second monomer mixture comprises at least one further polymer which is at least partially compatible with the polymer obtained from the second monomer mixture and which is selected from the group consisting of polycarbonates, polyesters, polyamides, polyalkylmethacrylates, polysulfones, poly(ether)sulfones, polypropylene, polyethylene, polytetrafluoroethylene and polystyrene-acrylonitrile.

4. A process as claimed in claim 3 where the further polymer has a glass transition temperature $T_g$ of >0° C.

5. A process as claimed in claim 1, where the rubber particles have a hard core made from a copolymer which has a glass transition temperature >0°C. and a refractive index above 1.53.

6. A process as claimed in claim 5, where the hard core has a refractive index above 1.56.

7. A process as claimed in claim 1, where the size of the rubber particles is below 10 μm.

8. A process as claimed in claim 1, where the rubber particles have a swelling index of from 2 to 200.

9. A process as claimed in claim 1, where the rubber particles are in the form of a dispersion in water when added to the second monomer mixture and, the mixture made from the rubber particles in water and from the second monomer mixture is homogized.

10. A process as claimed in claim 1, where, based on the weight of the second monomer mixture, up to 80% by weight of a solvent has been added to the second monomer mixture.

11. A process as claimed in claim 1, where the polymerization of the second monomer mixture is executed in suspension.

12. The process of claim 8 wherein the swelling index is from 3 to 100.

13. The process of claim 12 wherein the swelling index is from 5 to 90.

* * * * *